United States Patent [19]
Whiteley

[11] 3,723,891
[45] Mar. 27, 1973

[54] FREQUENCY TO VOLTAGE CONVERTER

[75] Inventor: Thomas B. Whiteley, Riverside, Calif.

[73] Assignee: The United States of America as represented by the Secretary of the Navy

[22] Filed: May 12, 1971

[21] Appl. No.: 143,678

[52] U.S. Cl. ..................329/103, 307/233, 307/246, 328/67, 328/151, 329/126
[51] Int. Cl. ..............................................H03d 3/04
[58] Field of Search ......329/103, 1, 2, 126; 307/246, 307/233; 328/67, 151

[56] References Cited

UNITED STATES PATENTS

| | | | |
|---|---|---|---|
| 3,582,799 | 6/1971 | Reid | 307/233 X |
| 2,834,883 | 5/1958 | Lukoff | 328/151 |
| 2,978,615 | 4/1961 | Chater | 307/233 X |
| 3,363,113 | 1/1968 | Bedingfield | 328/151 X |
| 3,371,291 | 2/1968 | Forrest et al. | 307/233 X |
| 3,593,171 | 7/1971 | Gassmann | 307/233 X |

*Primary Examiner*—Alfred L. Brody
*Attorney*—R. S. Sciascia, G. J. Rubens, J. W. McLaren and T. M. Phillips

[57] ABSTRACT

A frequency to voltage converter including a switching circuit responsive to an input signal at each zero crossing in the positive direction to charge a capacitor to a peak negative voltage and discharging through a resistor towards a positive voltage until the next zero crossing in the positive direction. The peak voltage charge is coupled to a holding circuit to provide a D.C. voltage proportional to the frequency of the input signal.

8 Claims, 3 Drawing Figures

INVENTOR.
THOMAS B. WHITELEY
BY

INVENTOR.
THOMAS B. WHITELEY

BY G. M. Phillips
George J. Rubens

FREQUENCY TO VOLTAGE CONVERTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to frequency to voltage conversion systems and more particularly to the concept of providing an exponential charging curve beginning at each crossover in the positive direction of a sinusoidal input signal.

Various methods for achieving an indication of the frequency of an alternating current signal have previously been devised. Such prior art circuits are not suitable where precise performance over a large dynamic range and time lag is important.

SUMMARY OF THE INVENTION

In the preferred form of the invention, an input signal (approximately sinusoidal) is shaped and differentiated by a very short time constant R.C. network. A switching circuit responsive to the negative pulse corresponding to the positive-going zero-crossing of the input signal, charges a capacitor to a peak negative voltage and is then discharged through a resistor toward a positive voltage. The peaks of the discharge waveform are sampled and then held constant until the next peak.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

It is well known that a linear ramp function generated at a zero crossover of an input sine wave, and allowed to rise until the next crossover, has a peak amplitude that is a measure of the length of time between crossovers. Instead of a linear ramp, the present invention utilizes an exponential curve, generated at successive crossovers of the input signal.

To obtain a voltage proportional to the frequency, $f$, which is the inverse of the period, $T$, the expression $$e_1 = K\,(1/T_O - 1/T)$$

represents a voltage proportional to the variation of $f = 1/T$ about the center frequency $fo = 1/T_O$. $K$ is the slope constant relating voltage and frequency, e.g. V/MHz.

A capacitor discharging through a resistance, $R$, from an initial voltage, $-E_1$, toward a supply voltage, $+E_2$, has an exponential discharge voltage represented by $$e = E - (E_1 + E_2)\,exp\,(^{-at})$$

where $a = 1/Rc$.

Then at $t = T$, $$ep = E_2 - (E_1 + E_2)\,exp\,(^{-aT})$$

where $e_p$ is the capacitor voltage reached after discharging for a time period $T$.

Considered as functions of a variable $T$, $e$ is a hyperbolic curve, and $e_p$ is an exponential curve. By optimum choice of parameters, the two curves can be made to very nearly coincide over a considerable range near $T = T_O$.

The peak voltage $e_p$ then is an instantaneous measure of the inverse period $1/T$, i.e., the frequency of the input signal.

It is obvious that $e_1 = O$ at $T = T_O$. In order that $e_p = 0$ at $T = T_O$, $$E_2 - (E_1 + E_2)\,exp\,(^{-aT_O}) = 0$$

$$E_2 = (E_1 + E_2)\,exp\,(^{-aT_O})$$

For best coincidence of the two curves the first and second derivatives with respect to T are equated at $T = T_0$ $$e_1' = K/T^2$$

$$e_1'' = -2K/T^3 = (-2/T)\,e_1'$$

$$e_p' = a\,(E_1 + E_2)\,exp\,(-aT)$$

$$e_p'' = -ae_p'$$

From $e_1' = e_p =$, $$K = aT_O^2(E_1 + e_2)\,exp\,(-aT_O) \text{ and}$$

from the second derivative, $$a = 2/T_O$$

In an example for a discriminator with 25 KHz center frequency $$To = 40\mu s$$

$$a = 2/40 = 0.050$$

$$RC = 20\mu s$$

$$exp\,(-aT_O) = 0.13534$$

$$\text{Assume } (E_1 + E_2) = 75\text{V}$$

$$E_2 = 0.1353 \times 75 = 10.1\text{V}$$

$$E_1 = 64.9V$$

Figure 3:
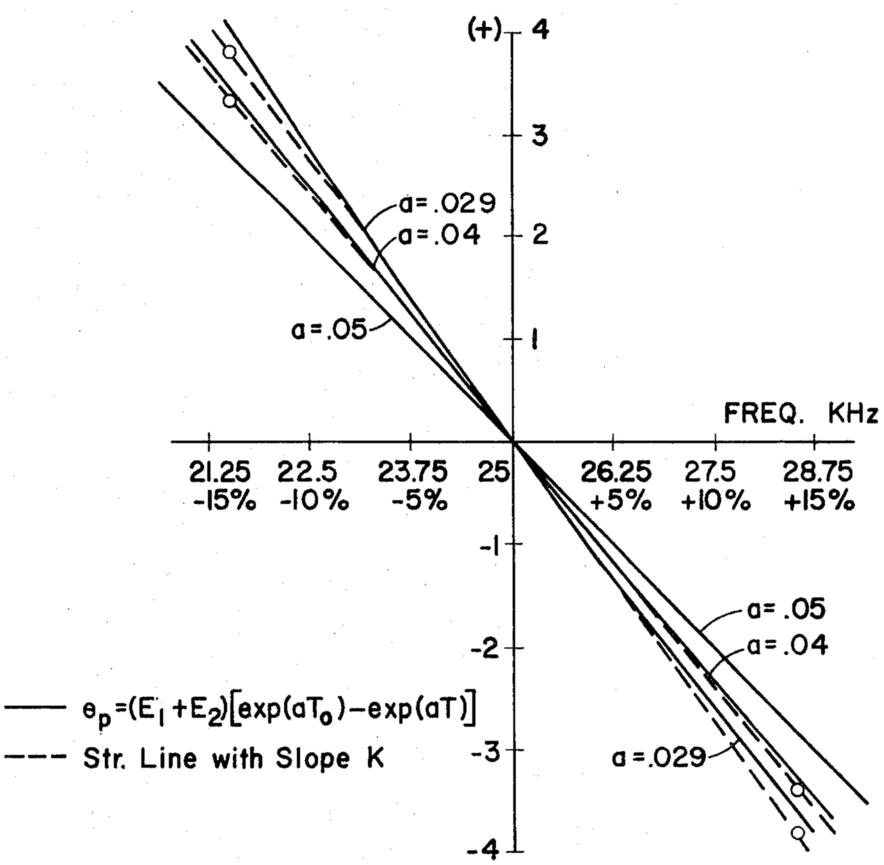
FIG. 3 is a graph showing the effect of variance from the computed values for best linearity.

The table below and the plotted voltage vs. frequency graph (FIG. 3) illustrate the effect of variance from the computed values for best linearity.

TABLE I

| a | exp(−aT₀) | $E_1$ | $E_2$ | K | Frequency range linearity within 2% |
|---|---|---|---|---|---|
| 0.05 | 0.13534 | 65V | 10V | 812 | ±20% |
| 0.04 | 0.20190 | 60V | 15V | 969 | ±10% |
| 0.029 | 0.31187 | 51.5V | 23.5V | 1090 | ± 6% |

Figure 1:
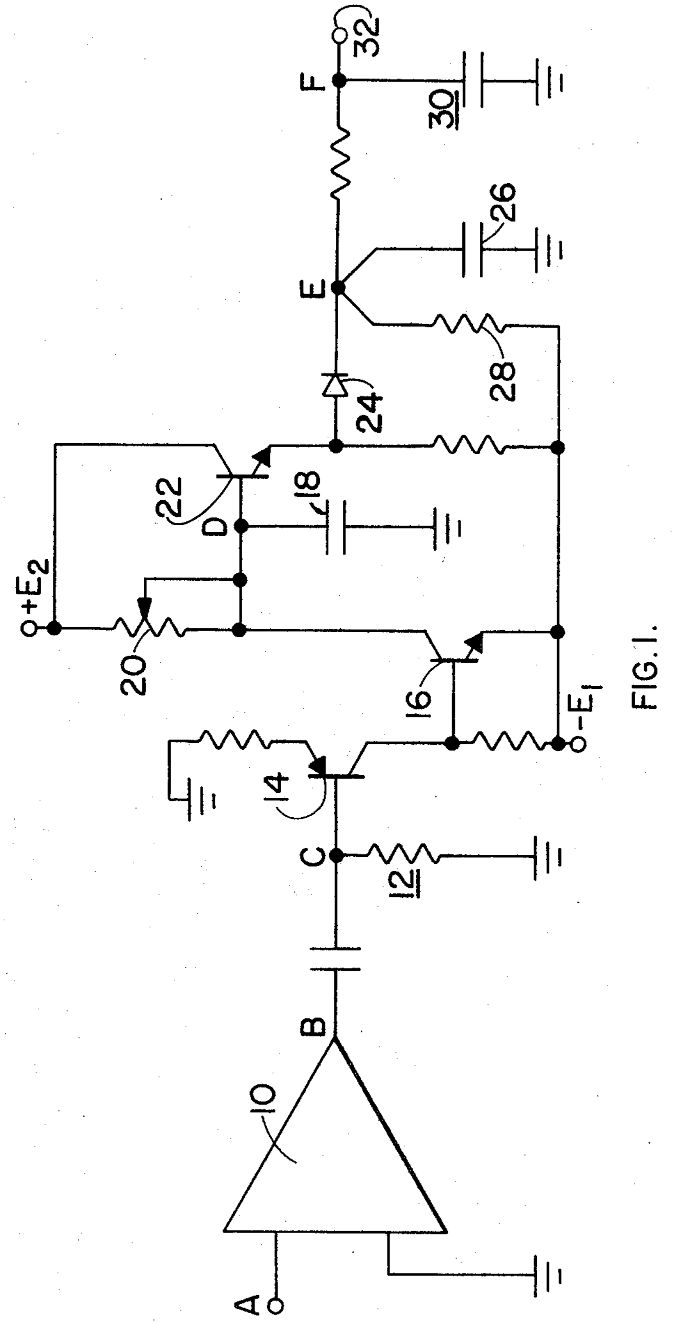
FIG. 1 is a schematic circuit diagram of one embodiment of the invention.
Figure 2:
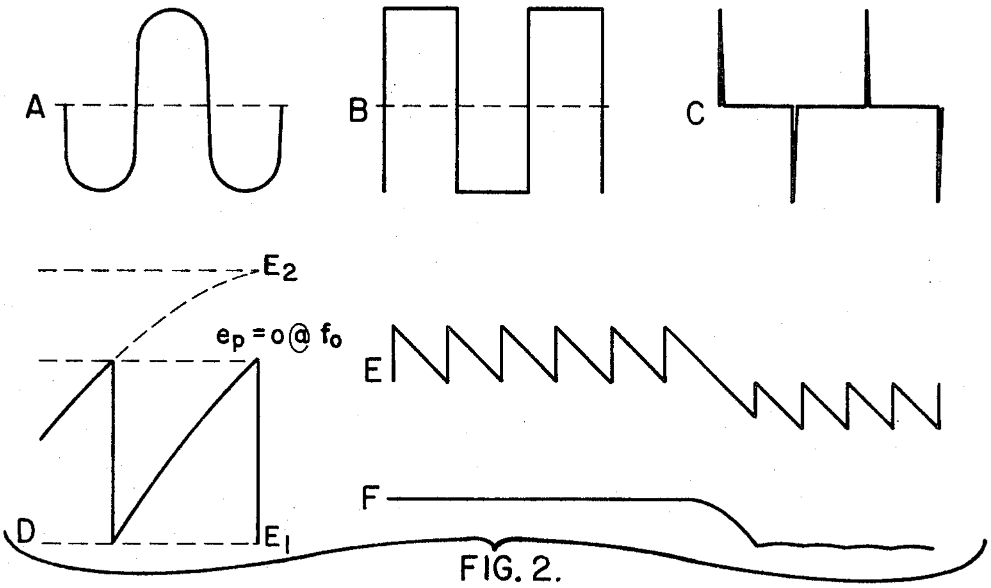
FIG. 2 is a representation of voltages in various parts of the circuit of FIG. 1.

The circuit of this invention is illustrated in FIG. 1 with the waveform at various points shown in FIG. 2.

Input signal, A, is applied to high gain limiting amplifier 10 which produces a square wave output, B. Square wave B, is differentiated by short time constant RC network 12 to produce waveform C. Limiter 10 and differentiator 12 should produce pulses (waveform C) of sufficient amplitude to trigger transistor 14, having a width not greater than one percent of $T_0$ and constant in amplitude and width over the expected amplitude range of input waveform, A. Transistor 14 is a PNP type which conducts only on negative pulses from differentiator 12. The negative pulses of waveform C correspond to the positive going zero crossings of the input signal. Transistor 16 is a NPN type having high breakdown voltage and current capability, conducts heavily when transistor 14 is conducting. Capacitor 18 is charged rapidly to voltage $-E_1$, and then released and allowed to discharge through resistor 20 towards $+E_2$ as shown by waveform D. The discharge of capacitor 18 is arrested by the next charging pulse, and the sequence repeats. Resistor 20 is provided with a trim adjustment so that the operation of the circuit can be adjusted precisely to zero at center frequency.

The peaks of waveform D are coupled by emitter follower 22 and silicon diode 24 to holding capacitor 26. The sawtooth voltage dropoff between peaks (waveform E) is caused by discharging of capacitor 26 through resistor 28. The dropoff rate should be selected to allow the output to follow the maximum expected rate of change of frequency. RC filter 30 coupled between holding capacitor 26 and output terminal 32 removes most of the carrier frequency sawtooth from the output (waveform F).

Obviously many modifications and variations of the present invention are possible in the light of the above teachings. It is therefore to be understood that within the scope of the appended claims the invention may be practiced otherwise than as specifically described.

What is claimed is:

1. A frequency to voltage converter for producing a direct current voltage having a magnitude proportional to the frequency of an alternating input signal comprising:
   a. an input terminal for receiving an input signal the frequency of which is to be measured;
   b. a capacitor;
   c. first means coupled to said capacitor for charging said capacitor to a known voltage;
   d. discharge circuit means coupled to said capacitor and to said input terminal for discharging said capacitor to a voltage that is an instantaneous measure of the frequency of the input signal; and
   e. sampling and holding circuit means coupled to said capacitor for maintaining an output voltage proportional to the frequency of said input signal.

2. The frequency to voltage converter of claim 1 wherein said first means includes a circuit responsive to said input signal passing through zero in the positive direction to stop the discharge of said capacitor and start the charging of said capacitor.

3. The frequency to voltage converter of claim 1 wherein said capacitor charging includes a negative voltage source so that said capacitor is charged to a known negative voltage.

4. The frequency to voltage converter of claim 1 wherein said discharge circuit means includes a positive voltage source so that the capacitor is discharged towards said positive voltage source.

5. The frequency to voltage converter of claim 4 wherein said sampling and holding circuit samples and holds the positive peak voltage to which said capacitor is discharged.

6. The frequency to voltage converter of claim 1 said first means includes:
   a. a negative voltage source;
   b. switch circuit means responsive to said input signal passing through zero in the positive direction for charging said capacitor to the magnitude of said negative voltage source.

7. The converter of claim 6 wherein said switch circuit means includes:
   a. a differentiator for generating negative pulses when said input signal passes through zero in a positive direction;
   b. a first transistor coupled to said differentiator and being responsive to said negative pulse for generating a trigger pulse;
   c. a second transistor having a high breakdown voltage and a high current capability in circuit with said first transistor, said negative voltage source and said capacitor for connecting said capacitor to said negative voltage source in response to said trigger pulse.

8. The converter of claim 4 wherein said discharge circuit means includes:
   a. a positive voltage source;
   b. an adjustable resistor connecting said capacitor to said positive voltage source so that said capacitor will discharge toward said positive voltage source.

* * * * *